United States Patent
Widjaja et al.

(10) Patent No.: US 7,830,585 B2
(45) Date of Patent: Nov. 9, 2010

(54) METHOD OF MAKING AN ION-SWITCHING DEVICE WITHOUT A SEPARATE LITHIATION STEP

(75) Inventors: Edy Widjaja, Singapore (SG); Gerdy Delporte, Dadizele (BE)

(73) Assignee: SAGE Electrochromics, Inc., Faribault, MN (US)

(*) Notice: Subject to any disclaimer, the term of this patent is extended or adjusted under 35 U.S.C. 154(b) by 1 day.

(21) Appl. No.: 12/514,162

(22) PCT Filed: Oct. 31, 2007

(86) PCT No.: PCT/EP2007/061710
§ 371 (c)(1),
(2), (4) Date: May 8, 2009

(87) PCT Pub. No.: WO2008/055824
PCT Pub. Date: May 15, 2008

(65) Prior Publication Data
US 2010/0007937 A1    Jan. 14, 2010

(30) Foreign Application Priority Data
Nov. 9, 2006    (EP) .................. 06023308

(51) Int. Cl.
*G02F 1/15* (2006.01)
*G02F 1/153* (2006.01)
(52) U.S. Cl. .............. 359/265; 359/270; 359/900
(58) Field of Classification Search ......... 359/265–275, 359/900; 204/192.11
See application file for complete search history.

(56) References Cited

U.S. PATENT DOCUMENTS

| | | | |
|---|---|---|---|
| 5,171,413 | A | 12/1992 | Arntz et al. |
| 5,370,775 | A | 12/1994 | Parkhe |
| 5,597,660 | A | 1/1997 | Bates et al. |
| 5,830,336 | A | 11/1998 | Schulz |
| 6,039,850 | A | 3/2000 | Schulz |
| 6,094,292 | A | 7/2000 | Goldner et al. |
| 2006/0209383 | A1 | 9/2006 | Burdis et al. |

OTHER PUBLICATIONS

Vink T. J. et al.: "Lithium trapping at excess oxygen in sputter-deposited a-WO3 films," Journal of Applied Physics, American Institute of Physics, New York, US, vol. 85, No. 3, Feb. 1, 1999, pp. 1540-1544.

(Continued)

*Primary Examiner*—Jack Dinh
(74) *Attorney, Agent, or Firm*—Lerner, David, Littenberg, Krumholz & Mentlik, LLP (57) ABSTRACT

In any manufacturing sequence for making a lithium ion-switching device, lithium has to be introduced at some stage into the device. An electrode inside the device is filled and depleted with lithium through an ion conductor at every use cycle of the device. Prior-art methods to introduce the lithium are: direct sputtering of lithium on the electrode, or electrochemically loading the electrode in an electrochemical cell, or indirectly loading the electrode after an ion conductor has been deposited on top of the electrode and still other methods. The inventive method disclosed makes such a separate lithiation step obsolete. The lithium is introduced at the same time as the ion-conductor is put on the electrode. This can be achieved by using an oxygen super-stoichiometric compound for the electrode.

12 Claims, 3 Drawing Sheets

OTHER PUBLICATIONS

Jie Chen et al., "All-solid-state electromic device: W03/LiA1F4:Li/VO2," Proceedings of the SPIE—The International Society of Optical Engineering SPIE-INT. Soc. Opt. Eng USA, vol. 2531, 1995, pp. 161-165.

Goldner R. B. et al., Completely Solid Lithiated Smart Windows, Sep. 1, 1989, Solar Energy Materials, Elsevier Science Publishers B.V., Amsterdam, NL, pp. 17-26.

Solar Energy Materials & Solar Cells, vol. 84 (2004) pp. 315-328.

PCT/EP2007/061710 International Search Report.

Fig. 5

METHOD OF MAKING AN ION-SWITCHING DEVICE WITHOUT A SEPARATE LITHIATION STEP

CROSS REFERENCE TO RELATED APPLICATIONS

The present application is a national phase entry under 35 U.S.C. §371 of International Application No. PCT/EP2007/061710 filed Oct. 31, 2007, published in English, which claims the benefit of European Patent Application No. 06023308.7, filed Nov. 9, 2006. The disclosures of said applications are incorporated by reference herein.

FIELD OF THE INVENTION

The inventive process relates to lithium ion switching devices such as lithium based electrochromic appliances or lithium based secondary batteries.

BACKGROUND OF THE INVENTION

Lithium is the metal with the smallest atomic radius. This unique position in the periodic table of elements entails many advantageous properties. Its smallness allows lithium to intercalate easily into the network of many solids. Upon intercalation lithium easily loses its outer electron to the network thereby altering the electronic structure of the solid it invades. The altered electronic structure expresses itself in changes of e.g. electron conductivity or optical absorption. Over and above, in many networks the process of intercalation is reversible in that lithium can be extracted—or de-intercalated—out of the solid's network by application of e.g. an external electric field. This property is advantageously used in Li-ion batteries as they are nowadays widely used in high-end applications such as lap top computers and cell phones. The change in optical absorption can be conveniently used to build electrochromic devices such as in switchable mirrors or glass panes with adaptable transmission. Although other elements such as hydrogen and sodium can also be used in such applications they suffer from disadvantages such as hydrogen being a gas and sodium being already quite large to enter a solid state network.

In order for such ion switchable devices to function, at least two types of material must be present (not taking into account the other trivial necessities as electrical contacting and encapsulating layers). Firstly—as already mentioned—an electrode must be present in which the lithium can easily enter and also, at least partly, exit the lattice (in case of a crystalline material) or network (in case of an amorphous solid). Such lithium activatable electrodes usually consist of compounds comprising oxides of transition. A notable example is e.g. tungsten oxide $W^{(+6)}O_3$ that is transparent for visual wavelengths. Upon intercalation of Li, $WO_3$ darkens with a bluish colour. Tungsten oxide bleaches upon lithium de-intercalation. Tungsten oxide is the most widely used electrode material in electrochromic devices. Another example of an electrode material is lithium cobaltate $LiCoO_2$ that is used as the cathode material of secondary batteries. It acts as a reservoir for lithium charging in secondary batteries.

Secondly, the lithium must be fed to the network as an ion, as otherwise it will not intercalate into the network. This can be accomplished by providing an ion conductor in close contact with the ion-switching electrode. Normally this is done in a planar configuration as this makes the contacting of both layers easy. Such an ion conductor conducts the $Li^+$-ions well while blocking the electrons.

By applying a voltage difference over the electrode/ion-conductor stack by means of a power source, $Li^+$-ions will be extracted out of the electrode, percolate through the ion conductor and be neutralised at the contact where they recombine with the electrons provided by the power source. This is of course when the ion conductor is negatively biased with respect the electrode contact. As a consequence a layer of atomic lithium will deposit between the ion conductor and the ion-conductor contact. Optionally, a counter electrode may be provided between ion-conductor and its contact. This counter electrode acts as a reservoir, collecting and neutralising the lithium ions. While for a battery or a reflective electrochromic device, such a counter electrode is not absolutely necessary, it is needed in case of a transmissive electrochromic device as the metallic lithium would inhibit the trespassing of light. Mutatis mutandis, when now the voltages are reversed, lithium atoms will be ionised at the lithium-ion conductor interface, travel through the ion-conductor and intercalate into the electrode.

From the above it will be clear that somewhere in the manufacturing process, lithium will have to be introduced into the device in order to make it work. However, this input of lithium turns out to be difficult due to a number of reasons. Firstly, when the lithium has reduced the electrode, the electrode becomes vulnerable to oxidation. Oxidation of the lithium in the electrode makes it ineffective in the use of the device. As many ion-conductors are indeed oxides, direct sputtering onto a lithiated electrode cannot be done in an oxidising atmosphere without special precautions. Secondly, the amount of lithium introduced into the device must be carefully controlled. Too much lithium readily leads to overcharging of the electrode. Over time, the following methods for introducing lithium into the device have been proposed:

A. Lithiation by sputtering or evaporation of metallic lithium directly onto the electrode
B. Lithiation by sputtering or evaporating lithium containing compounds directly onto the electrode
C. Lithiation by electrochemical means directly onto the electrode
D. Lithiation after the ion conductive layer has been deposited onto the electrode One way of implementing method 'A' has been described in U.S. Pat. No. 5,830,336 and U.S. Pat. No. 6,039,850. Lithium is sputtered away from a metallic lithium target onto the electrode by means of an argon plasma that is magnetically confined in the vicinity of the target. The target is preferably AC (10 to 100 kHz, US '336) or pulsed DC powered (US '850). This method results in a well controlled way of adding lithium to the electrode as well as being compatible with the previous low pressure atmosphere sputtering of the electrode (in case $WO_3$, pressure can remain low, no exposure to atmosphere). However the method also has drawbacks: the handling and sputtering of metallic lithium targets is not straightforward due to the very oxidising nature of Li. Also the deposition step of the electrode—generally performed in an oxidising atmosphere—must be well separated from the lithiation step in order to prevent oxidation of the target and electrode. Notable is that lithiation has to be performed as a separate process step.

Method 'B' uses targets of lithium containing compounds that either do not form a compound layer on the electrode (and only leave the Li behind) or that form a compound or alloy that later on can be advantageously used. The former method is e.g. described in U.S. Pat. No. 5,288,381 wherein $Li_2CO_3$ in an argon atmosphere is sputtered on an electrode material. The $Li_2CO_3$ decomposes during sputtering to yield lithium metal and volatile gas components that are removed by pumping. The latter method—of which U.S. Pat. No. 5,019,420 is an illustration—alloys of e.g. LiSi are sputtered onto the electrode until sufficient Li intercalation is achieved. The electrode is after this step coated with a Li depleted Si layer. Subsequently, the sample is submitted to an oxidising atmosphere, where an oxide containing ion-conductor is grown. In either case, method 'B' necessitates the insertion of a supplementary processing step between electrode deposition and ion conductor deposition.

Method 'C'—illustrated in U.S. Pat. No. 5,370,775—necessitates the exposure of the electrode to atmospheric circumstances. Indeed once the electrode has been deposited (be it by sputtering or by any other known technique in the art such as wet chemical coating), it has to be transferred into an electrolytic chamber containing a Li electrode or a Li containing electrolyte. While again a separate lithiation step is needed, it now even has to be performed in a different environment—a fluid—then the environment wherein the electrode has been deposited.

Method 'D' is illustrated in U.S. Pat. No. 6,094,292 wherein lithiation is done after the deposition of the electrolyte—in this case lithiumphosphorousoxynitride—through a separate lithiation step (cfr. FIG. 16, Example 4, how lithiation is performed is not revealed). In other embodiments (FIG. 10, FIG. 12, Example 1 and 2) of this patent, the lithium is provided through the deposition of $LiCoO_2$ on top of the electrolyte, as a counterelectrode. Lithiumcobaltate is a preferred choice of material as it is transparent when oxidised and absorbing when reduced, hence is complementary to the electrode. Again, first the electrolyte is deposited followed by a separate step wherein lithium is fed into the device.

SUMMARY OF THE INVENTION

A first object of the invention is therefore to provide a method wherein no separate lithiation step is needed in order to feed an ion switching device with the necessary lithium. The necessary lithium can already be contained in a basic subset of the device namely the electrode and ion-conductor. A further object of the invention is to provide a method to tune the thickness of the electrolyte to the optimal ion switching device parameter by changing the stoichiometry of the electrode material. A related object to this is that the thickness of the electrolyte can also be varied by controlling the stoichiometry of the electrolyte itself. A further object of the invention is to provide a method to control the lithiation during deposition. It is also an object of the invention to provide an electrochromic device exploiting the principles underlying the inventive method.

According a first aspect of the invention, a method is presented to make a subassembly of lithium ion switching device. Such an ion switching device can be an electrochromic window or a lithium ion based battery: the principles of the invention are equally applicable to both. First an electro conductive substrate must be provided. Such a substrate is needed to make electrical contact to the subassembly of the device. Such a contact can take any form as known in the art although Transparant Conductive Oxides (TCO's) are mostly used when it concerns electrochromic devices. Most well known are indium tin oxide (ITO) or aluminium zinc oxide (ZOA) and the variations thereon such fluoride doped tinoxide (FTO). Of course, when transparency is no issue (for example in the case of batteries or mirrors) a metal layer will do equally well.

On top of the electro conductive substrate a lithium activatable electrode is deposited. Such an electrode has the correct amorphous or crystalline structure to allow intercalation and de-intercalation of lithium atoms. Such an electrode inevitably comprises oxides of the transition metals that have a relatively large atomic radius such as tungsten, tantalum, nickel, molybdenum, niobium chromium, or alloys thereof that can serve as hosts for lithium intercalation. The method by which the electrode is deposited is immaterial, although it is preferred that the layer is deposited by means of a vacuum deposition technique such as chemical vapour deposition or—most preferred—physical vapour deposition. Within the family of physical vapour deposition techniques, sputtering is most preferred although vapour deposition preferably in combination with an ion beam technique is equally well possible. Wet chemical deposition techniques are not excluded but less preferred, as they frequently demand a further heat treatment and not always result in the optimal dense network or lattices for ion-switching purposes.

For electrochromic devices, basically two types of electrodes can be discerned those that darken (become less transparent) upon lithiation (cathodically colouring, CaC) and those that bleach (become more transparent) upon lithiation (anodically colouring, AnC). By preference the two types are present in an electrochromic device and are acting complementary to one another in two electrode layers mounted oppositely to one another with an electrolyte in between. When the cathodically colouring electrode is negatively and the anodically colouring electrode is positively biased, $Li^+$-ions are de-intercalated from the anodically colouring electrode thereby becoming less transparent. The $Li^+$-ions travel through the electrolyte towards the cathodically colouring electrode wherein they intercalate thereby darkening that electrode. A multiplicative absorbing effect is therewith obtained. Upon reversal of the polarity at the electrodes, the states are interchanged leading to a transparent state for both electrodes.

Typical compositions for electrodes in an electrochromic device are: tungsten oxide (cathodically colouring), nickel oxide (anodically colouring), molybdenum oxide, niobium oxide, tungsten tantalum oxide, nickel tantalum oxide, nickel tungsten oxide (anodically colouring) or alloys thereof. Specifically $WO_3$ is used as an electrochromic electrode.

Typical compositions for electrodes in a battery are lithium cobaltate, lithium mangate, lithium nickelate, lithium nickel manganese oxide, lithium nickel cobalt manganese oxide, lithium nickel cobalt oxide, lithium vanadium oxide, lithium iron phosphate, lithium vanadium phosphate, lithium cobalt vanadium oxide, lithium titanium oxide, lithium silicon tin oxynitride.

On top of the electrode layer, a solid state electrolyte is sputter coated. Such an electrolyte must be solid (hence liquid electrolytes are not considered) and must be applicable through sputtering (thereby excluding solid polymer electrolytes) and most preferably reactive sputtering as this entails some control on the stoichiometry of the composition. Lithium ions must be able to travel easily through the electrolyte, while electron conductivity must be low, in order to prevent ion-electron recombination in the electrolyte. In many cases the electrolyte is also referred to as the Ion Conductur (IC).

Typical compositions for the electrolyte are one out of the group lithium phosphate, lithium phosphorus oxynitride, lithium niobate, lithium silicate, lithium aluminum silicate, lithium silicon oxynitride, and lithium silicon phosphorus oxynitride, lithium aluminum fluoride, lithium nickel manganese oxide, lithium nickel cobalt manganese oxide, lithium nickel cobalt oxide, lithium vanadium oxide, lithium iron phosphate, lithium vanadium phosphate, lithium cobalt vanadium oxide, lithium titanium oxide, lithium silicon tin oxynitride or combinations thereof.

The most preferred electrolyte is lithium phosphorous nitride or LiPON as it is normally called. The material is extremely well studied and documented. Most preferred compositions are $Li_xPO_yN_z$ wherein x is approximately equal to 2.8, 2y+3z is about 7.8 and 0.16<z<0.48 as described in U.S. Pat. No. 5,597,660.

Stacking this type of layers one above the other is standard in the art. What is now particularly surprising of the method is that the inventors found that when the metal-oxide of the electrode is superstoichiometric, a part of the lithium deposited during the electrolyte deposition step will enter the metal oxide lattice and be fixed while the remaining part of lithium can be reversibly extracted. By using a superstoichiometric metal oxide, the separate lithiation step turns out not to be necessary anymore resulting in a more efficient process.

The advantage is particularly outspoken for the case of electrochromic windows with tungsten oxide as an electrode material. In what follows an effort will be made in order to explain a possible physical mechanism underlying this method. However, the explanation is tentative and not limiting the claims in any ways. The fact that the method is illustrated on $WO_3$ is not to be regarded as a delimitative: the inventors believe the method is equally well applicable to other metal oxide system.

The building block of stoichiometric $WO_3$ is an octahedron wherein a central tungsten atom is surrounded by 6 oxygen atoms. The oxygen atoms are at the vertices of the octahedral and are shared between adjacent octahedra. The valency of the tungsten is in that configuration 6+ and for oxygen 2−. Schematically:

The bonding is not completely ionic and a covalent part exists forming a conduction band (W5d orbitals) and a valence band (O2p orbitals). However, in an amorphous and even in a crystalline network, all bonds are never fully satisfied and various defects such as dangling bonds, vacancies, insertions and interstitials exist. Oxygen vacancies will lead to vacancies that can be neutral, singly or doubly charged, depending on the local atomic configuration (the formulae represent local atomic arrangement in the linear chains formed by the diagonals in the octahedral, each dash '—' represents a bound electron, EQ1):

Oxygen insertion can lead to peroxide like configurations (EQ2):

In a stoichiometric compound, these defects exist together but the number of insertions and vacancies compensate for one another. It has been described by various authors (e.g. G. A. Niklasson et al in 'Electrochromic tungsten oxide: the role of defects', Solar Energy Materials & Solar Cells, Vol. 84 (2004) p 315-328) that colouration of tungsten oxide is due to the formation of $W^{5+}$ sites, wherein a tungsten atom loses a single electron to the conduction band. The levels between which photon absorption takes place is still a matter of debate, but the existence of a broad absorption peak at 1.2 eV has been correlated with the presence of $W^{5+}$.

When now lithium is sputtered onto such a stoichiometric film, some of the interstitial oxygen will bind with a first part of the lithium. As oxygen is taken out of the chain, the following configuration might be formed (EQ3):

which—when taking the atomic balance—both are the equivalent of forming stable $Li_2O$. The lithium is irreversibly bound, but on the other hand, no colouration is implied by this configuration.

A second part of the lithium will bind to the oxygen vacancies in the EQ1 configurations to form (EQ4):

Only the insertion of lithium in the [ ]A configuration of EQ1 changes the number of $W^{(5+)}$ configurations. As these lithium atoms heal the defects in the lattice, they are believed not to be reversible. As the $W^{(5+)}$ sites lead to colouration, this colouration is non-reversible.

In addition a third part of the lithium atoms will insert interstitially into the lattice (in between the octahedrons) and will donate its single electron to the lattice, thereby reducing some of the $W^{(6+)}$ sites to colouring $W^{(5+)}$ sites. This colouring is reversible as the lithium atom ionises and can be diffused out of the lattice under an electric field.

It has been observed that feeding lithium to sputtered stoichiometric $WO_3$ films leads to colouration that is not reversible. In the light of the above, the explanation is that while the number of interstitial oxygen sites balances the number of oxygen vacancies, the former lead to permanent non-colouring centres, while the latter result in permanent colouring centres. Such films are less usable as they have a permanent bluish colour. One solution to this is to deposit films that are more crystalline in nature such that the number of defects (oxygen vacancies and oxygen interstitials) is less. These films can however not be loaded with lithium without a separate lithiation step.

The inventors have now found that by providing $WO_{3+x}$ superstoichiometric in oxygen two problems are solved:
- The unbalancing of the defects (more insertions than vacancies) suppresses the formation of permanent $W^{5+}$ centres as the Li is bound by the oxygen according EQ2. Hence, no permanent coloration occurs during lithiation.
- The presence of oxygen pulls the Li into the lattice thereby forming interstitial Li that can be reversibly removed by the application of an electric field. Hence, no separate lithiation step is needed.

The amount of lithium available for insertion can be controlled in a number of ways:

Firstly, one can adapt the content of Li in the sputter target used to form the ion conductor layer. An increase in Li content will result in a faster 'doping' of the electrode, while a reduction in Li content will result in a slower 'doping' as less lithium atoms are bombarding the electrode during sputtering.

Secondly, the degree of overstoichiometry will determine how much lithium will enter the electrode. The more oxygen is in it, the more lithium the electrode will be able to absorb.

Thirdly, the total amount of lithium in the electrolyte is of course depending on the thickness of the layer. As the lithium is quite mobile in the electrolyte, the amount entering into the electrode is hardly diffusion limited.

Controlling the amount of lithium available for insertion is important in that it allows to increase the thickness of the electrolyte without saturating the electrode with lithium. Indeed, in order to obtain sufficient electronic resistance in the electrolyte one wants to increase its thickness. However, in many cases this is not possible because of saturation of the electrode. Introducing an electrode overstoichiometric in oxygen overcomes this problem The degree of intercalation of the lithium into the electrode can be monitored during deposition. This can be done with off-line measurements (bringing the stack outside the sputtering region to measure the transmittance, as e.g. described in U.S. Pat. No. 6,039,850) or on-line wherein the measurement is performed in the sputtering region. During the sputtering the lithium will intercalate the electrode. In the case of an $WO_3$ electrochromic device, as long as oxygen inserted into the [—W—O—] chains is available part of the lithium will bind to this excess oxygen. Concurrently, while the inserted oxygen is being consumed, the Li will start to colour the layer by the formation of $W^{(5+)}$ and the layer transmission will decrease. The degree of transmission can be used to stop the sputtering.

For anodically colouring materials like e.g. W—Ni—O the effect of lithiation is just the opposite. Initially the electrode layer is absorbing. Upon sputtering with LiPON, the lithium starts to intercalate and the layer becomes more and more transparent. The W—Ni—O layer will reach a maximum transmittance associated with a certain lithium content in the layer. Further lithium intercalation will reduce the transmittance. This point of maximum transmittance and the further decrease upon further decrease upon lithium intercalation can be used as a process control to stop the sputtering.

The person skilled in the art will readily understand that in stead of the transparency also the reflectivity can be used in order to assess the degree of lithiation.

The above findings can be readily expanded to other materials and applications such as batteries and electrochromic devices.

According a second aspect of the invention, a device, more in particularly an electrochromic device, is presented that at least comprises a stack of material made as per the method and variations to that method described above. Such a device comprises an electro conductive substrate on which a lithium activatable electrode comprising a metal oxide, more particularly a transition metal oxide, is coated. On top of the electrode a solid state electrolyte is sputter coated from a compound comprising lithium. Prior to coating the electrolyte, the metal oxide of the electrode contains more oxygen than prescribed by stoichiometry. The excess oxygen prevents the formation of a permanent coloration and makes a separate lithiation step superfluous.

Particularly preferred is the device wherein the electrode is superstoichiometric tungsten oxide and the electrolyte is lithium phosphorous oxynitride.

Another preferred device is wherein a liquid or polymer electrolyte is sandwiched between two stacks of material made as per the method and variation to that method described above. The polymer or liquid electrolyte is in contact with the solid state electrolyte of the stack.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
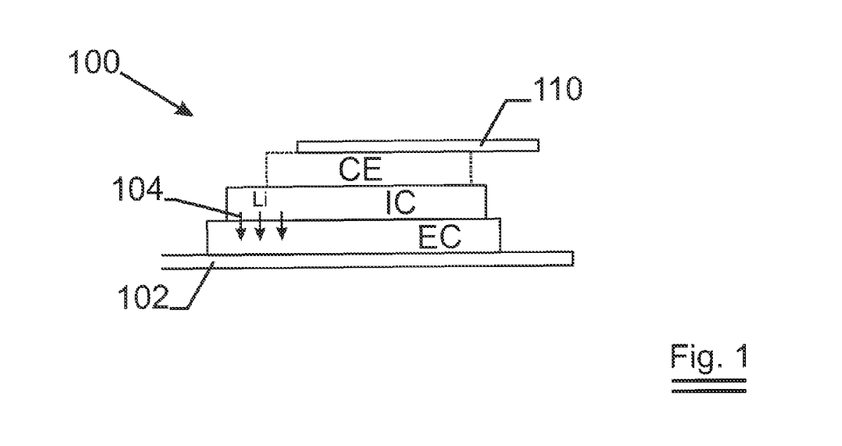
FIG. 1 shows how the stack of layers according the invention is build up.

FIG. 1 describes a stack of a lithium ion switching device 100 in its most general form. There is the first electric contact 102 whereon an electrode EC is deposited. In the case of an electrochromic device, this electrode EC changes optical properties upon intercalation—shown with arrows 104—or de-intercalation of lithium. In the case of a battery, the electrode EC acts as a reservoir for Li having its lowest energy content when lithium is intercalated into the network. On top of the electrode EC, an ion conductor IC is sputtered. The ion conductor IC has a high conductivity for lithium ions and a high resistance for electrons. On top of the ion conductor IC, an optional counter electrode CE is sputtered. The counter electrode CE is optional as it is not always needed for certain applications. Also the stack of electrode EC with ion conductor IC is on itself a stack that can be used in an ion-switching device. A second electric contact 110 extracts or provides electrons from or to the counter electrode (EC).

In a first example (EXAMPLE 1) of the stack was deposited on a polymer PET (poly ethylene terephthalate) substrate pre-coated with a tin-doped indium oxide (ITO) as a transparent conductor 102. A thin film of tungsten oxide was deposited on top of this electric contact 102 as an electrode EC layer. The tungsten oxide was deposited from a metallic tungsten target by DC reactive sputtering in an oxygen/argon mixed atmosphere till about 240 nm thick. No intentional heating was applied to the substrate during deposition.

The charge associated with lithium insertion or extraction can be measured during electrochemical intercalation and de-intercalation in a wet-electrochemical cell. In the typical set-up the sample is immersed in a 1 M lithium perchlorate ($LiClO_4$) in propylene carbonate solution. The sample under study is the working electrode while a $Li^+/Li$ is used as the counter electrode and another $Li^+/Li$ electrode is used as a reference electrode. A variable voltage between working electrode and counter electrode is slowly and cyclically applied while the current is measured in that branch. The voltage itself is measured between the working electrode and the reference electrode. The I-V characteristic shows a closed loop. The initial loop shows the largest charge unbalance (more $Li^+$ is going in than that there is coming out), an unbalance that slowly zeros out after a number of cycles. The sum of the charge unbalance over the different cycles is directly proportional to the amount of lithium permanently lost in the sample.

The tungsten oxide film of the first example absorbed lithium ions with an equivalent charge of 7.61 mC/cm². When attributing this fixation of lithium to an excess of oxygen in the tungsten oxide $WO_{3+x}$, x can be inferred to be 0.067.

Figure 2:
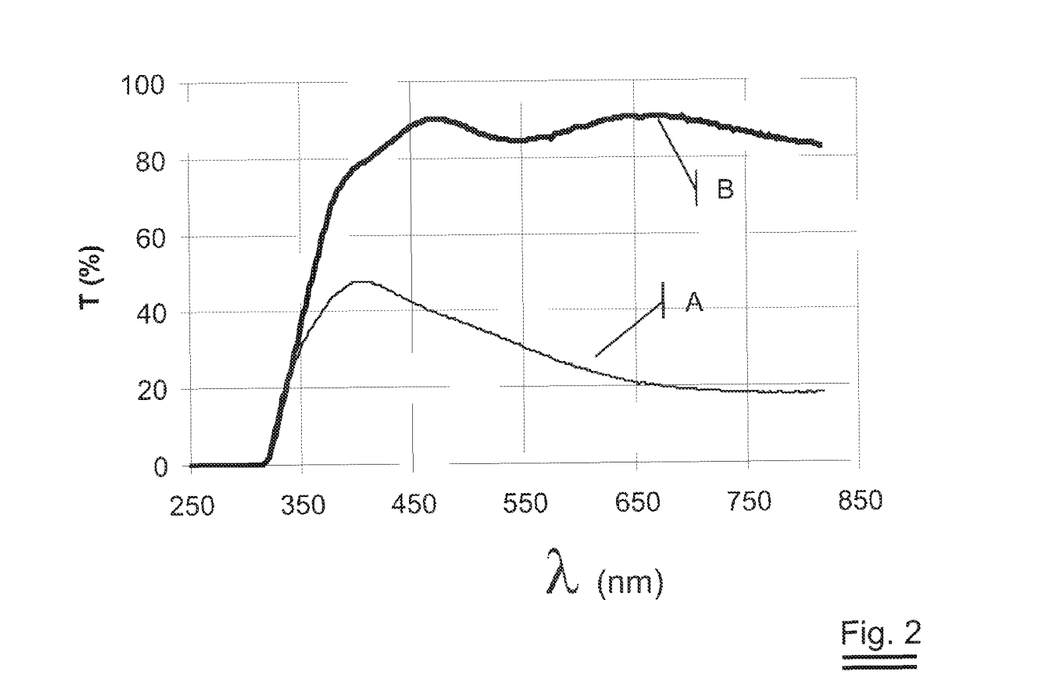
FIG. 2 shows the transmission results obtained on a first preferred embodiment EXAMPLE 1.

On top of this electrode EC a thin layer of LiPON was deposited by radiofrequency (RF) sputtering from a ceramic $Li_3PO_4$ target in a nitrogen atmosphere. FIG. 2 shows the optical transmission result of the stack first electrical contact 102, tungsten oxide electrode EC, LiPON ion conductor IC as measured in an electrochemical cell on first cycle. Curve A shows the transmission results 'as deposited'. Due to the intercalation of lithium that has occurred during the sputtering of the LiPON, the film is absorbing and has a low transmission. Upon bleaching the stack by biasing the first electrode positively with respect to the cell, the film becomes transparent: curve B of FIG. 2. The stack can be cycled between both states. As is clear from the above, no separate lithiation step was needed to provide the necessary lithium into the device.

Figure 3:
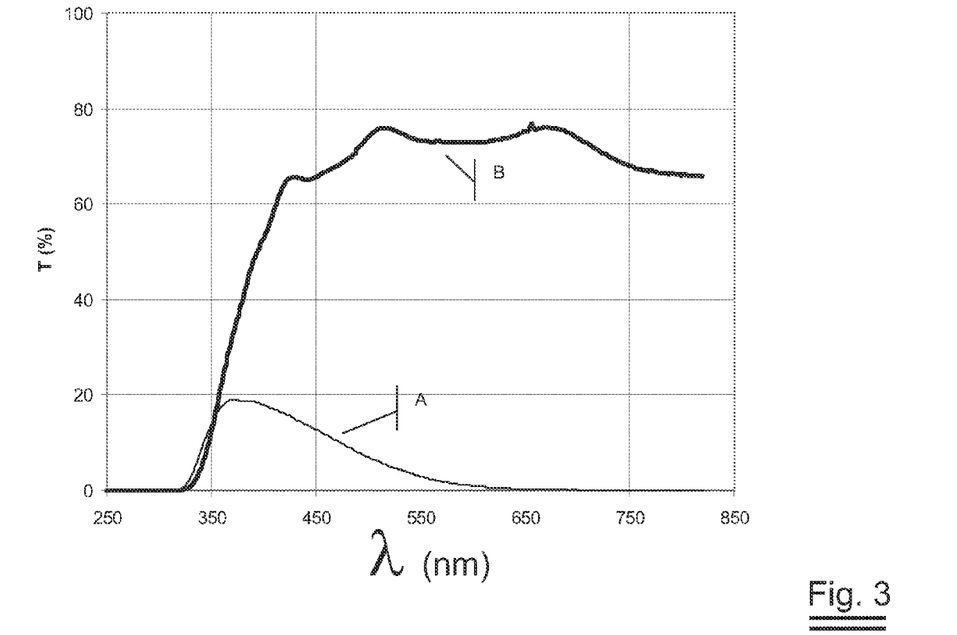
FIG. 3 shows the transmission results obtained on a second preferred embodiment EXAMPLE 2.

In a second example (EXAMPLE 2) essentially the same stack was produced as in EXAMPLE 1 but now the substrate was glass coated with fluorinated tin oxide. The substrate was intentionally heated during deposition of tungsten oxide. Deposition at higher temperature is known to result in crystalline tungsten oxide. The tungsten oxide was also thicker (357 nm) than in EXAMPLE 1. Again the presence of excess oxygen was determined via cyclic voltammetry. Approximately 12.25 mC of charge per $cm^2$ in the form of $Li^+$ ions was lost in the bare tungsten oxide upon the initial cycles. Out of that an 'off-stoichiometry' value 'x' of 0.07 can be estimated. After coating with LiPON the charging and decharging of lithium was reversible. The transmission spectrum of the stack is shown in FIG. 3. In the 'as deposited' state of the contact/EC/IC stack—the curve marked 'A' in FIG. 3—the stack is absorbing as the lithium has intercalated the electrode EC. Upon extraction of the lithium, the stack becomes transparent.

Figure 4A:
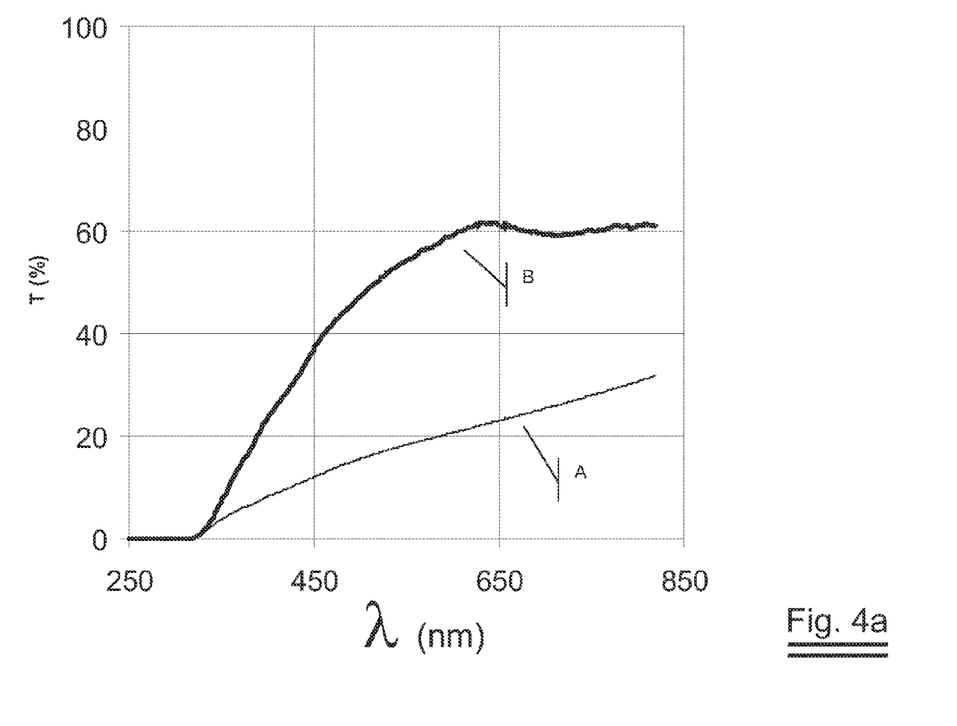
FIG. 4a shows the transmission results obtained on a third preferred embodiment EXAMPLE 3.

In a third example (EXAMPLE 3) an anodically colouring material was used as the electrode EC. W—Ni—O, as an electrode, was deposited on a glass plate coated with a fluorinated tinoxide transparent conductor. The about 220 nm W—Ni—O thin film was deposited by DC reactive sputtering from a metallic target in oxygen atmosphere. A typical transmittance of such stack is shown in FIG. 4a, curve A. It is absorbing when no lithium is in.

On top of this, a LiPON thin film as IC layer was deposited from a ceramic $Li_3PO_4$ target in a nitrogen atmosphere (about 90 nm thin) During the deposition, the lithium enters the W—Ni—O lattice and the transmission changes. Transmittance of the stack 'as deposited' is shown as curve 'B' in FIG. 4a. In an electrochemical cell the lithium can be extracted from the W—Ni—O layer, resulting in an absorptive layer. About 25 $mC/cm^2$ could be extracted out of the W—Ni—O and LiPON film stack demonstrating that the lithium was actually incorporated during sputtering with LiPON.

Figure 4B:
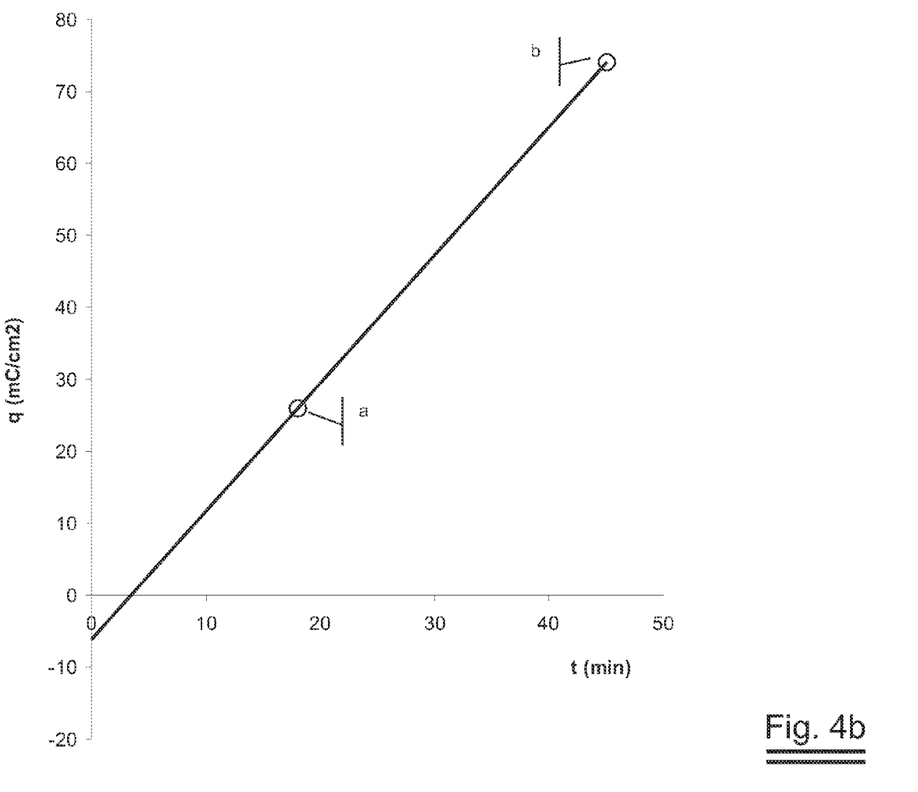
FIG. 4b shows the amount of lithium absorbed as function of the thickness on EXAMPLE 3.

The amount of lithium incorporated during the process can be controlled through the thickness of the LiPON layer. The thicker the layer, the more lithium is provided. The thickness of the LiPON layer is proportional to the sputtering time. By now plotting the extracted lithium amount as a function of the sputtering time, one can estimate how much lithium irreversibly is taken up in the W—Ni—O layer. Such a graph is represented in FIG. 4b wherein the abscissa shows the LiPON sputtering time in minutes and the ordinate the amount of charge per unit area that is electrochemically extractable from the EC|IC stack in $mC/cm^2$. The measurement points 'a' and 'b' give an estimate for the irreversibly incorporated lithium in the W—Ni—O of about 5 to 10 $mC/cm^2$ when extrapolated to zero IC layer thickness.

Furthermore, the content of the sputter target can be adjusted to be Li-rich or Li-deficient in the $Li_3PO_4$ to further allow fine-tuning for EC device synthesis.

Although the examples shown relate to nitrogen containing lithium phosphorous oxide, sputtering of lithium phosphorous oxide in an oxygen atmosphere shows similar behaviour. Furthermore, any lithium containing electrolyte such as $LiNbO_3$, $LiAlF_4$, LiSiPON, etc when deposited via sputtering will allow the same novel idea of direct lithiation. This idea is therefore applicable for sputtering of lithium-containing targets to form an ion conductor IC layer and thereby lithiate the electrode EC at the same time.

As a fourth example (EXAMPLE 4), an electrochromic device comprising two stacks made according the inventive method are presented. The first stack is a [Glass|Fluoride-doped tin oxide|W—Ni—O|LiPON] stack. This stack is anodically colouring. The second stack is a [Glass|Fluoride-doped tin oxide|$WO_{3+x}$|LiPON stack]. This stack is cathodically colouring. The $WO_{3+x}$, W—Ni—O and LiPON layers are deposited in sputtering processes. When now a liquid or polymeric electrolyte is introduced between the two stacks, a device with complementary colouring is achieved. The total lithium charge available is the combination of the direct lithiation of each electrode layer. Furthermore, the EC layers are not limited to those given in these examples. Other known electrochromic layers will allow the same principles, such as $MoO_3$, NiO, $Nb_2O_5$, W—Ta—O, Ni—Ta—O and their alloys.

In a fifth example (EXAMPLE 5), a full solid state device was made consisting of the following stack list:
1. Glass
2. Fluoride-doped tin oxide
3. W—Ni—O as a first electrode EC obtained by DC sputtering a metallic target in an oxygen atmosphere. The thickness is about 100 nm.
4. LiPON as an ion-conductor obtained via RF reactive sputtering of a ceramic $Li_3PO_4$ in a nitrogen atmosphere.
5. $WO_{3+x}$ deposited by DC reactive sputtering in a mixed argon-oxygen atmosphere from a metallic target. The layer was about 100 nm thick.
6. A semitransparent gold electrode as second electrical contact.

Figure 5:
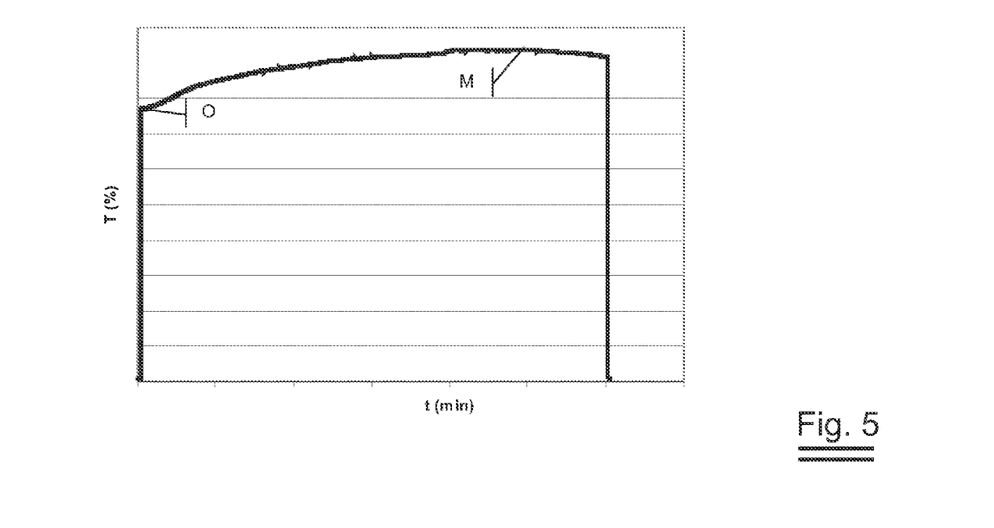
FIG. 5 shows the in-situ monitored transmission of a fifth preferred embodiment EXAMPLE 5.

During the deposition of the LiPON ('4' in the stack list), the transmittance of the film was monitored as reproduced in FIG. 5. There the sputtering time of the LiPON is shown in abscissa and the transmission in ordinate. After the shutter in the coating apparatus is opened (indicated with 'O'), the transmittance starts to increase, due to lithium intercalation into the W—Ni—O layer. After the transmittance has reached a maximum (indicated with 'M') the layer becomes saturated. This stack functions as a monolithic device. No lithiation step was carried out and the lithium charge responsible for coloration in the device comes from ion-conductor deposition. With this device, transmission changes from 32% to 51% at 550 nm wavelength and 30% to 49% at 650 nm wavelength were measured when charge cycling the device. When increasing the thickness of the W—Ni—O layer ('3' in the stack list) to 150 nm and increasing the corresponding LiPON thickness by increasing the sputtering time, as monitored by the transmittance measurement, increased dynamic transmission changes were noticeable: at 550 nm from 14% to 35% and at 650 nm from 13% to 39%.

The invention claimed is:
1. A method for producing a stack of layers as a part of a lithium ion switching device comprising the steps of:
   providing an electro conductive substrate;
   coating a lithium activatable electrode onto said substrate, said electrode comprising a metal oxide which is super-stoichiometric in oxygen; and
   sputter coating a solid state electrolyte layer from a compound comprising lithium onto said electrode,
   whereby lithium atoms intercalate into said electrode to provide a source of lithium to said electrode eliminating the need for a separate lithiation step and wherein the intercalation of at least part of the lithium is reversible.

2. The method according to claim 1 including further controlling the availability of lithium for intercalation by means of the lithium content of the electrolyte.

3. The method according to claim 1 including monitoring the degree of lithium intercalation during deposition of said solid electrolyte by measuring the degree of optical transparency or reflectivity of said stack.

4. The method according to claim 1 wherein the electrolyte is selected from the group consisting of lithium phosphate, lithium phosphorus oxynitride, lithium niobate, lithium silicate, lithium aluminum silicate, lithium silicon oxynitride, and lithium silicon phosphorus oxynitride, lithium aluminum fluoride, lithium nickel manganese oxide, lithium nickel cobalt manganese oxide, lithium nickel cobalt oxide, lithium vanadium oxide, lithium iron phosphate, lithium vanadium phosphate, lithium cobalt vanadium oxide, lithium titanium oxide, and lithium silicon tin oxynitride.

5. The method according to claim 4 wherein the electrolyte is lithium phosphorous oxynitride.

6. The method according to claim 1 wherein said lithium activatable electrode is an electrochromic electrode made of a metal oxide selected from the group consisting of tungsten oxide, nickel oxide, molybdenum oxide, niobium oxide, tungsten tantalum oxide, nickel tantalum oxide, nickel tungsten oxide, lithium cobaltate or alloys thereof.

7. The method according to claim 6 wherein the electrochromic electrode is made of super-stoichiometric tungsten oxide.

8. The method according to claim 6 wherein the electrochromic electrode is made of super-stoichiometric tungsten nickel oxide.

9. The method according to claim 1 wherein the activatable electrode comprises a battery electrode selected from the group consisting of lithium cobaltate, lithium mangate, lithium nickelate, lithium nickel manganese oxide, lithium nickel cobalt manganese oxide, lithium nickel cobalt oxide, lithium vanadium oxide, lithium iron phosphate, lithium vanadium phosphate, lithium cobalt vanadium oxide, lithium titanium oxide, and lithium silicon tin oxynitride.

10. An electrochromic device comprising a stack of layers made according to the method of claim 1.

11. The electrochromic device according to claim 10 wherein the electrode comprises superstoichiometric tungsten oxide and the electrolyte comprisess lithium phosphorous oxynitride.

12. The electrochromic device of claim 10 comprising a polymer or liquid electrolyte held between two stacks of layers made according to claim 1, said two stacks of layers being oppositely mounted to one another wherein said solid electrolyte is in contact with said polymer or liquid electrolyte.

* * * * *